OR   3,967,883

United States Patent [19]
Meyerhofer et al.

[11] 3,967,883
[45] July 6, 1976

[54] LIQUID CRYSTAL DEVICES OF THE SURFACE ALIGNED TYPE

[75] Inventors: Dietrich Meyerhofer; Alan Sussman, both of Princeton, N.J.

[73] Assignee: RCA Corporation, New York, N.Y.

[22] Filed: May 22, 1975

[21] Appl. No.: 579,969

[52] U.S. Cl. .................................. 350/160 LC
[51] Int. Cl.² .................................. G02F 1/16
[58] Field of Search .................... 350/160 LC; 428/1

[56]     References Cited
         UNITED STATES PATENTS
3,834,792   9/1974   Janning.......................... 350/160 LC

OTHER PUBLICATIONS

Raynes, E. P., "Improved Contrast Uniformity in Twisted Nematic Liquid–Crystal Electro–Optic Display Devices," Elec. Lett. vol. 10, No. 9, 5/2/74.
Dixon, G. D., Brody, T. P., Hester, W. A., "Alignment Mechanism in tiwsted Nematic Layers" Appl. Phys. Lett. vol. 24, No. 2, 1/15/1974, pp. 47–49.

*Primary Examiner*—John K. Corbin
*Assistant Examiner*—Rolf Hille
*Attorney, Agent, or Firm*—Glenn H. Bruestle; Birgit E. Morris

[57]     ABSTRACT

For the purpose of controlling the alignment of the molecules of a liquid crystal material, one or more inside surfaces of the device enclosure is coated with successive slant evaporated layers. In one embodiment, the first or bottom layer is deposited at a comparatively high angle of deposition relative to the substrate surface, and the second or covering layer is deposited at a comparatively low deposition angle and at right angles to the direction of deposition of the first layer. In another embodiment, the two layers are interchanged. In both embodiments, the upper layer is extremely thin in comparison with the bottom layer.

7 Claims, 8 Drawing Figures

LIQUID CRYSTAL DEVICES OF THE SURFACE ALIGNED TYPE

This invention relates to liquid crystal devices, and particularly to liquid crystal devices of the type having surface aligned liquid crystal molecules.

Such surface aligned liquid crystal devices are now well known, see, for example, U.S. Pat. No. 3,834,792 issued on Sept. 10, 1974 to John L. Janning, the subject matter of said patent being incorporated herein. Such devices have utility, for example, for displaying images indicative of the time of day.

One problem with previously known devices of this type is that the viewing angle thereof is somewhat limited; except within a comparatively small angle the general appearance and legibility of the displayed image of the device is quite sensitive to changes in viewing angle. While techniques have been developed for increasing the device viewing angle, such techniques themselves have introduced certain new problems relating to the uniformity of appearance of the displayed image. This invention is directed towards improving both the viewing angle and appearance problems of such devices.

IN THE DRAWINGS

It is known that a preselected alignment of the molecules of, e.g., nematic liquid crystal materials, with surfaces of a liquid crystal cell can be obtained by coating the cell surfaces with various materials using a "slant" or "slope" evaporation process described in the aforecited patent to Janning. In such evaporation process, certain materials, such as aluminum, gold, magnesium fluoride, or silicon monoxide, are directionally vacuum deposited onto the cell surfaces using a vapor deposition angle of approximately 10° to the plane of the surface being coated.

Figure 1:
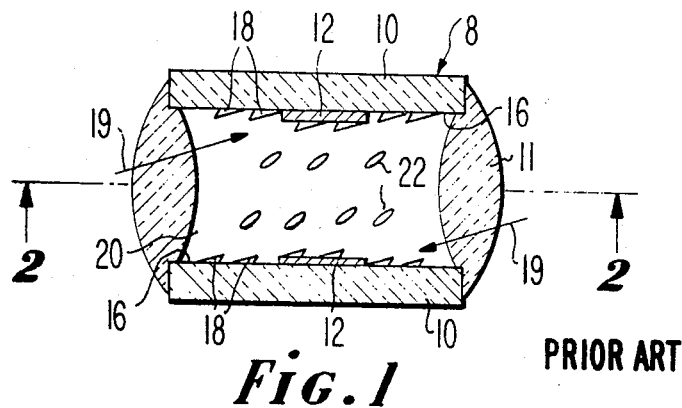
FIG. 1 is a schematic cross-sectional view of a prior art liquid crystal cell of the surface aligned type.
Figure 2:
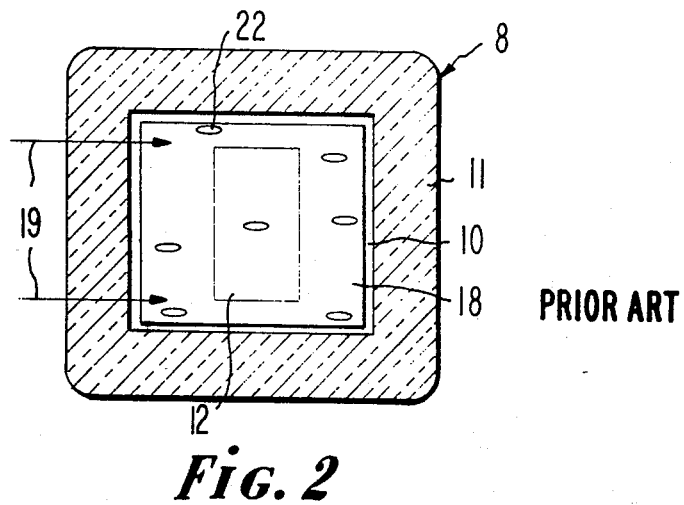
FIG. 2 is a cross-sectional view of the cell shown in FIG. 1 taken along line 2—2 thereof.

The result of using such process in a liquid crystal cell is illustrated in FIGS. 1 and 2 which show a cell 8 comprising a pair of oppositely disposed, spaced apart substrates 10, e.g., of transparent glass, sealed together by a rim seal 11, a conductive film electrode 12, of e.g., aluminum, on a surface 16 of each substrate, the two electrodes 12 being in oppositely disposed relation, and a "layer" 18 of, e.g., silicon monoxide, deposited by a slant evaporation process using a vapor deposition angle of 10° between the silicon monoxide source and the substrate surfaces 16.

The directions along which the layers 18 were grown on the substrates 10, prior to the assembly of the substrates into the cell 8, is indicated by the arrowed lines 19, such directions of growth being parallel to the plane of the paper of FIG. 1, and at an angle of 10° to the plane of the paper of FIG. 2. The layer 18 contacts both the electrode 12 and the surface 16 of each substrate. The contour of the layer 18 (FIG. 1) is taken from FIG. 3 of the Janning patent, the exact appearance of such layers not being known by us. As shown, the layer 18 is thought to be quite discontinuous.

A thin film 20 of a liquid crystal material is disposed between the two substrates 10, molecules 22 of the liquid crystal material being shown schematically as ellipsoids.

As shown, the longitudinal axis of each of the liquid crystal molecules 22 is aligned in a plane parallel to the planes of growth (FIG. 2) of the layer 18 and in a direction (FIG. 1) related to the deposition angle of the layer 18. Thus, in the device shown in FIG. 1, the molecules 22 are tilted about 30°–45° from the plane of the surface 16 of each substrate 10. This alignment of the molecules is in the absence of an electric field.

Figure 3:
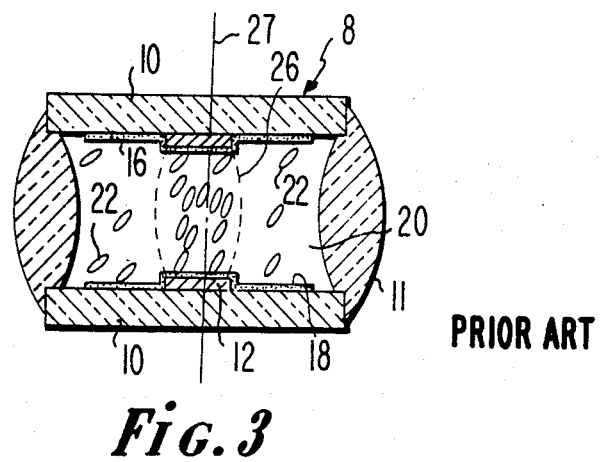
FIG. 3 is a view similar to that of FIG. 1 but showing, in schematic fashion, the effect of the presence of an electric field within the cell.

When a voltage is applied between the two electrodes 12, thus giving rise to an electric field through the liquid crystal film 20, as indicated by the dashed lines 26 in FIG. 3 (the layer 18 being shown simply as a continuous layer for ease of illustration), the molecules 22 within the electric field are rotated towards the perpendicular. Owing to the elastic forces associated with the layers 18 tending to retain the molecules 22 in the surface aligned, tilted orientation, the amount of angular reorienting of the various molecules is greatest with increasing distance from the layers 18. Also, and the significance of this is discussed below, owing to the elastic forces associated with the layers 18, even those molecules most remote from the layers 18 are not rotated (with the field strengths typically used) all the way to the perpendicular.

The molecules outside the electric field are not rotated.

The optical characteristics of the rotated molecules are different from those of the non-rotated molecules, thus enabling the display of an optical image as desired. This is known.

An advantage of this prior art arrangement is that because of the existing or "bias" tilt of the molecules induced by the layers 18 in the absence of an electric field, the rotation of the molecules by the field is always in the direction of the existing molecular tilt. That is, in this illustration, all the molecules within the field are rotated in the counter clock-wise direction. Thus, even though the molecules are not rotated completely to the perpendicular, all the rotated molecules are tilted in the same direction away therefrom. Such uniform tilting of the rotated molecules provides uniform optical characteristics, and, substantially regardless of the angle at which the device is viewed, all those portions of the device containing rotated molecules have a uniform appearance.

A disadvantage of this arrangement, however, is that owing to the tilt bias of the non-rotated molecules, there is a range of viewing directions of the device along which the difference in optical characteristics between the non-rotated and rotated molecules is comparatively small, thus providing poor optical contrast of the displayed image. These directions are approximately parallel to the molecular axes of the non-rotated molecules, i.e., parallel to the tilt bias axis.

Figure 4:
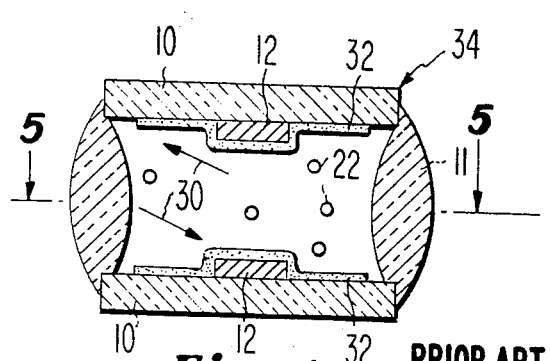
FIG. 4 is a view similar to that of FIG. 1 but showing another prior art cell.
Figure 5:
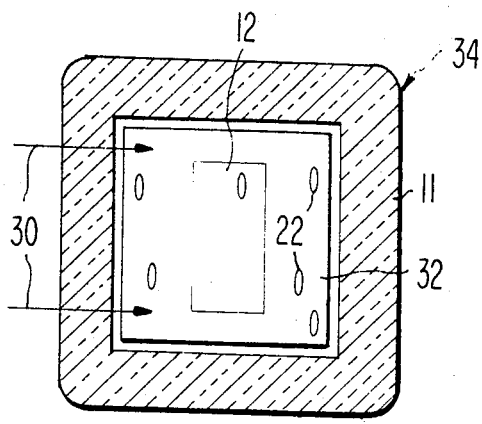
FIG. 5 is a cross-sectional view of the cell shown in FIG. 4 taken along line 5—5 thereof.
Figure 6:
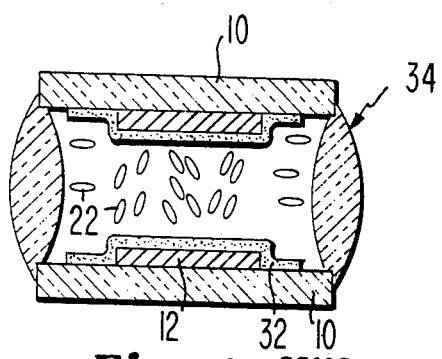
FIG. 6 is a view similar to that of FIG. 4 but at a right angle thereto and showing the effect of the presence of an electric field within the cell.

This problem with the tilt bias of the liquid crystal molecules was overcome when it was discovered that by using a slant evaporation of about 30° to the plane of the substrates (rather than the 10° angle used in the FIG. 1 device), the liquid crystal molecules are aligned substantially parallel to the substrate surfaces. This is illustrated in FIGS. 4, 5, and 6. The directions along which the material of the slant evaporated layers 32 of this cell 34 were deposited onto the substrates 10 is indicated by the arrowed lines 30 in FIGS. 4 and 5. As shown in these figures, and this is different from the molecular alignment shown in FIG. 1, the molecules 22 are aligned at right angles to the direction of growth of the layer 32. Why this is so is not known. Also, the layer 32 (FIG. 4) is not shown with the characteristic growth orientation pattern of the slant evaporation layer 18 shown in FIG. 1. Observations have revealed no such growth pattern, and the layer 32 appears, under magnification, to be substantially continuous.

As shown in FIG. 6, upon the application of an electric field through the device, the liquid crystal molecules within the field are rotated towards the perpendicular. An advantage of this device is that, because the non-rotated molecules are parallel to the substrate surfaces, the difference between the optical characteristics of the rotated and non-rotated molecules is considerably less dependent upon the device viewing angle, and the viewing angle of the cell 34 is correspondingly greater than the viewing angle of the cell 8.

A disadvantage of the arrangement of the cell 34, having no tilt bias of the molecules, however, is that because of the absence of such a bias, the molecules can rotate either clock-wise or counter clock-wise upon the application of an electric field; the result being, as shown in FIG. 6, that different batches or groups of molecules 22 are tilted in different directions with respect to the perpendicular. The optical characteristics of these tilted groups of molecules varies depending upon the angle of view thereof, and for any given viewing angle, the differently tilted groups of molecules display areas of different contrast, i.e., the displayed image has a somewhat patchy appearance.

In accordance with this invention, a device is fabricated which is, to some extent, a compromise between the advantages and disadvantages of the two prior art cells 8 and 34. That is, in the new cell according to the invention, a tilt bias of the molecules is present, to give rise to a common direction of rotation of the field rotated molecules, but the tilt bias is considerably smaller than that present in the prior art cell 8 so as to minimize the cell viewing angle limitations imposed by such tilt bias.

This is accomplished as follows.

In one embodiment of the invention, a first slant evaporation process is performed at a comparatively large angle, e.g., 30°, to the plane of the substrate surface to deposit a first layer on a cell substrate. Without more, the result of this, as explained above in connection with the description of the prior art cell 34, is that the liquid crystal molecules would be aligned in a direction at right angles to the directions of growth of the first layer, and the molecules would be generally parallel, with little or no tilt, to the substrate surface.

Thereafter, a second slant evaporation process is performed at a comparatively small angle, e.g., 10°, to the plane of the substrate surface to deposit a second layer covering the first layer. The purpose of the second layer is to modify the aligning characteristics of the first layer to the extent that the liquid crystal molecules have at least a small tilt with respect to the substrate surface. The two layers are preferably grown at right angles to one another, whereby, with respect to the alignment of the molecules in directions parallel to the substrate surface, the two layers have the same aligning affect.

In order that the molecules do not have an excessive degree of tilt with respect to the substrate surfaces, the second deposited layer, which gives rise to such tilt, is made quite thin, about 10A thick, so as not to completely mask or override the aligning characteristics of the first layer. The combined effect of both layers is to induce a result which is the equivalent of a degree of tilt intermediate that which is produced by either layer alone.

Stated differently, the coverage of the bottom layer by the upper layer is sufficiently "small" so as to allow the bottom layer to contribute, along with the upper layer, to the alignment directions of the liquid crystal molecules. The "smallness" of coverage may result, as described below, from an incomplete or discontinuous coverage of the bottom layer by the upper layer, or by virtue of the extreme thinness of the upper layer, the surface contour of the bottom layer thus influencing the surface contour of the upper layer.

Figure 7:
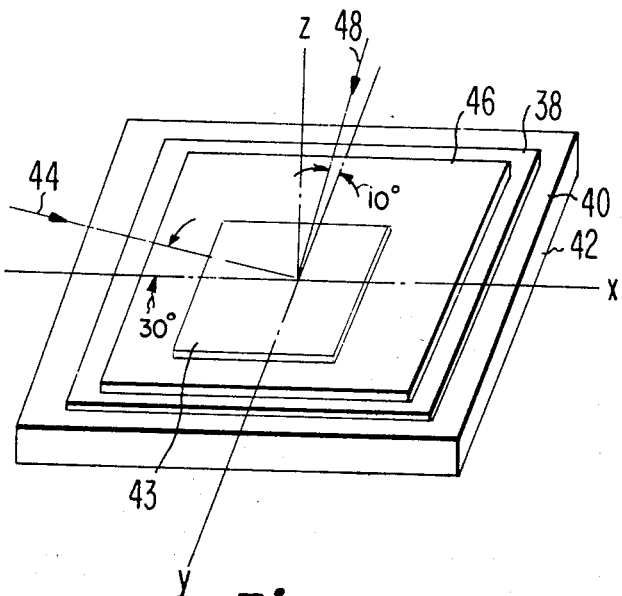
FIG. 7 is a view in perspective of one substrate of a liquid crystal cell made in accordance with this invention.

In somewhat greater detail, by way of specific example, a first layer 38 (FIG. 7) of silicon monoxide having a thickness of about 500A is vacuum deposited in a slant evaporation process, such as that shown in the aforecited Janning patent, at an angle of about 30° to the surface 40 of a cell substrate 42 having an electrode 43 thereon comprising, for example, a 100A thick layer of aluminum. The direction of growth of the layer 38 is indicated in FIG. 7 by the arrowed line 44, the three dimensions of the substrate 42 being referenced by an x-y-z set of axes.

Figure 8:
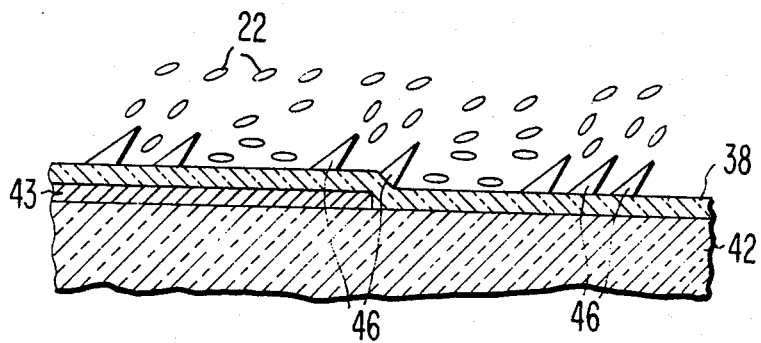
FIG. 8 is a view, on an enlarged scale and schematic, of a portion of a substrate and adjacent liquid crystal molecules of a cell made in accordance with this invention.

Thereafter, a second layer 46 of silicon monoxide having a thickness of about 5–10A is similarly deposited on the first layer 38. The direction of growth of this layer 46, indicated by the arrowed line 48, is at right angles to the direction of growth of the first layer 38, the layer 46 being deposited at an angle of about 10° to the substrate surface. Owing to the extreme thinness of the second layer 46, it is believed that the layer 46 is quite nonuniform and randomly discontinuous in its coverage of the first layer 38, as shown in FIG. 8, portions of the first layer 38 thus being exposed through the second layer 46.

Because the two layers 38 and 46 have been grown at right angles to one another, in the directions shown, both layers are effective to induce alignment of the liquid crystal molecules in directions parallel to the y-z plane (FIG. 7) of the substrate 42, i.e., parallel to the plane including the direction 48 of growth of the second layer 46.

With respect to the tilt of the molecules, it is thought (and this is somewhat conjectural) that each of the two layers 38 and 46 tends to affect the tilt of the molecules 22 immediately adjacent thereto somewhat independently of the affect of the other layer, the tilt effects of the two layers merging and modifying one another with increasing distance from the layers. Thus, according to this theory, illustrated in FIG. 8, immediately adjacent to those surface portions of the first layer 38 exposed through the second layer 46, the tilt of the molecules is determined substantially solely by the aligning effects of the first layer 38, i.e., the molecules have no tilt. Conversely, immediately adjacent to the discrete portions of the second layer 46, the molecules have a comparatively large tilt, e.g., 40°. With increasing distance from the layer surfaces, however, the aligning forces of the two layers tend to combine and produce a tilt intermediate the tilt provided by either layer alone, the tilt of the molecules through the film of liquid crystal material averaging out at about 1°–5°.

In the assembly of devices made in accordance with this invention, each of two substrates can be provided with two slant evaporated layers, and the two substrates assembled together in known fashion to provide a cell having a general appearance such as that shown in FIG. 1.

Depending upon the orientation of the two substrates with respect to the directions of growth of the slant evaporated layers thereon, varying degrees of twist of the liquid crystal molecules from substrate to substrate can be obtained as generally known, see for example, the aforecited patent to Janning and U.S. Pat. RE 27,911 issued to Dreyer on Feb. 5, 1974.

In another embodiment, only one of the two cell substrates is provided with the two slant evaporated layers as above described, the other substrate being provided with only one such slant evaporated layer, either a comparatively high or a comparatively low angle deposited layer. The characteristics of such a device are somewhat intermediate those of a cell having two such layers on each substrate and a cell having, in accordance with the prior art, only one slant evaporated layer on each substrate.

In another embodiment, not illustrated since the contours of the resulting layers are not known, the sequence of the depositions is reversed; the first or bottom layer being deposited at a comparatively low angle, e.g., 10°, and the second or upper layer being deposited at a comparatively high angle, e.g., 30°. To avoid masking the aligning characteristics of the bottom layer by the covering layer, the latter is made quite thin, e.g., about 5 to 10A. The first or bottom layer has a somewhat greater thickness, e.g., about 500A.

It presently appears that neither the materials nor the slant evaporation angles used is critical. For example, the comparatively high angle deposited layer, e.g., the bottom layer 38 shown in FIG. 7, can be provided using a deposition angle of between about 20° to 50°. The comparatively low angle deposited layer, e.g., the upper layer 46 shown in FIG. 7, can be provided using a deposition angle below 15°. Between the two ranges of deposition angles, i.e., above 15° and below 20°, the aligning characteristics of the deposited layer are somewhat indeterminate, and such deposition angles are generally avoided for this reason. Additionally, while the two layers are preferably deposited along directions at right angles to each other, as above described, this angle can also vary somewhat, e.g., between 80° and 110°.

Also, while not yet tried, it is expected that other materials can be used for either or both the two slant evaporated layers of this invention. This follows because separate layers having the desired aligning affects on liquid crystal materials at both high and low layer deposition angles have been slant evaporated using such materials as silicon dioxide ($SiO_2$), magnesium fluoride ($MgF_2$), and gold. Also, based upon reports in the literature, it is believed that certain other materials, such as chromium, platinum, and aluminum could also be used in accordance with the invention.

Using slant evaporated layers of silicon monoxide, the lower or bottom layer (e.g., the layer 38 shown in FIG. 6) can be, generally, in the thickness range of between 100 and 100A. The upper or covering layer (e.g., the layer 46 in FIG. 6) is generally below 20A in thickness. By "thickness" is meant average thickness, the actual thickness of such thin films varying considerably over the extent thereof.

It presently appears that the aligning effects of such slant evaporated layers result from the physical or geometrical rather than the chemical characteristics of such layers. Accordingly, it is expected that substantially the same layer thicknesses and slant evaporating angles should be used with materials other than silicon monoxide.

What is claimed is:

1. A liquid crystal device comprising,
    an enclosure having a surface,
    a first layer on said surface,
    a second layer on said first layer,
    said first and second layers having been deposited by slant evaporation processes onto said surface along directions at about right angles to each other, one of said layers evaporated at a deposition angle of between 20° and 50° to said surface and the other of said layers evaporated at a deposition angle of less than 15° to said surface and
    a liquid crystal material in contact with said second layer.

2. The device of claim 1 in which at least one of said first and second layers is evaporated from a source of silicon monoxide.

3. The device of claim 1 in which the coverage of said first layer by said second layer is so small as to allow said first layer to influence the alignment of molecules of said liquid crystal material relative to said surface.

4. The device of claim 3 in which said second layer is discontinuous thereby exposing surface portions of said first layer to direct contact with said liquid crystal material.

5. The device of Claim 3 in which the thickness of said second layer is less than about 20A.

6. The device of Claim 1 in which said one layer deposition angle is about 30° and said other layer deposition angle is about 10°.

7. The device of Claim 6 in which at least one of said first and second layers is evaporated from a source of silicon monoxide.

\* \* \* \* \*